United States Patent [19]

Mellyn

[11] 4,003,170

[45] Jan. 18, 1977

[54] LOADING DOCK SHELTER STRUCTURE

[75] Inventor: Charles W. Mellyn, Hudson, N.Y.

[73] Assignee: W. B. McGuire Co., Inc., Hudson, N.Y.

[22] Filed: Oct. 15, 1975

[21] Appl. No.: 622,676

[52] U.S. Cl. .............................. 52/173 DS; 135/5 A
[51] Int. Cl.² ......................................... E04F 10/04
[58] Field of Search ............... 52/173 DS; 135/5 A; 160/82; 14/71

[56] References Cited

UNITED STATES PATENTS

| | | | |
|---|---|---|---|
| 3,322,132 | 5/1967 | Rieder et al. | 135/5 A |
| 3,484,883 | 12/1969 | Van Marle | 135/5 A |
| 3,528,086 | 9/1970 | Conger | 52/173 DS |
| 3,538,655 | 11/1970 | Frommelt et al. | 52/173 DS |
| 3,638,667 | 2/1972 | Frommelt et al. | 135/5 A |

*Primary Examiner*—J. Karl Bell
*Attorney, Agent, or Firm*—Albert C. Johnston

[57] ABSTRACT

A shelter to shield the loading passageway between a truck end and a dock door opening is provided with an improved yieldably biased extension system positioning the front frame member which supports cover material over the passageway and carries upright face panels for sealing engagement with the end of a truck backed thereinto. The extension system includes sets of angularly related arms pivotably connected to each other and to the frame member at each side of the shelter, with means constantly forcing on the arm sets so that the frame member normally is held in a limited outward position yet the locations of its supporting arm connections are displaceable toward the dock door opening either together or independently of one another as the truck end presses against the face panels. The face panels will thus conform in position to any posture of the docked truck relative to the door opening, so as to provide and maintain an effective sealing engagement.

13 Claims, 4 Drawing Figures

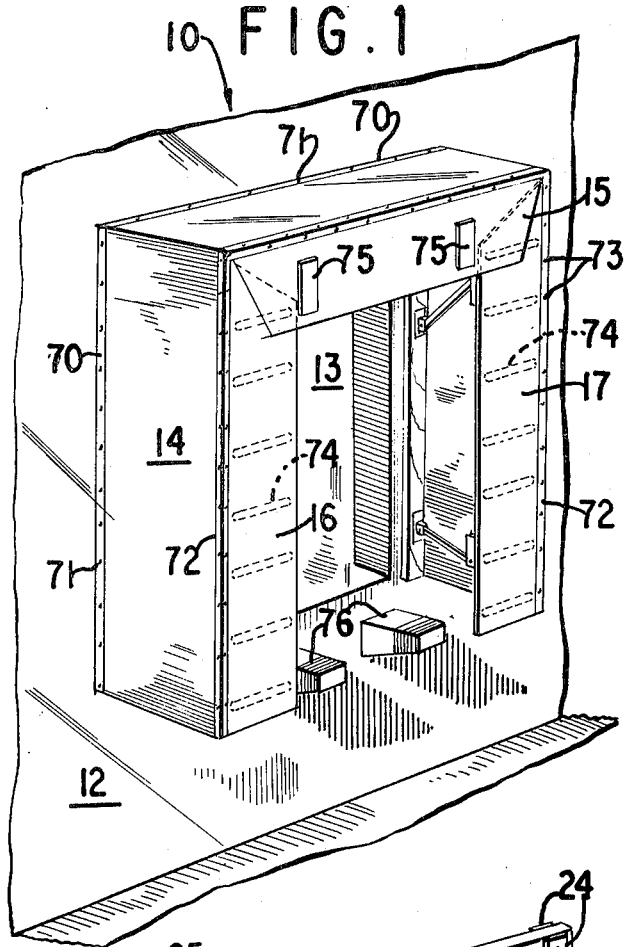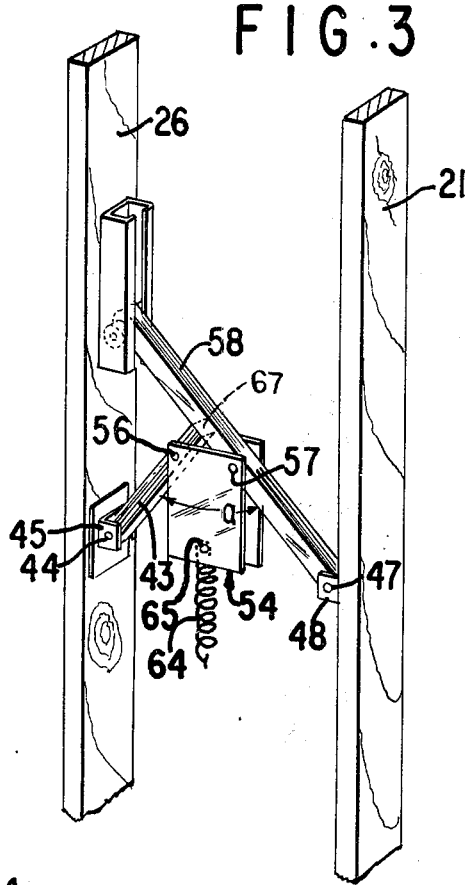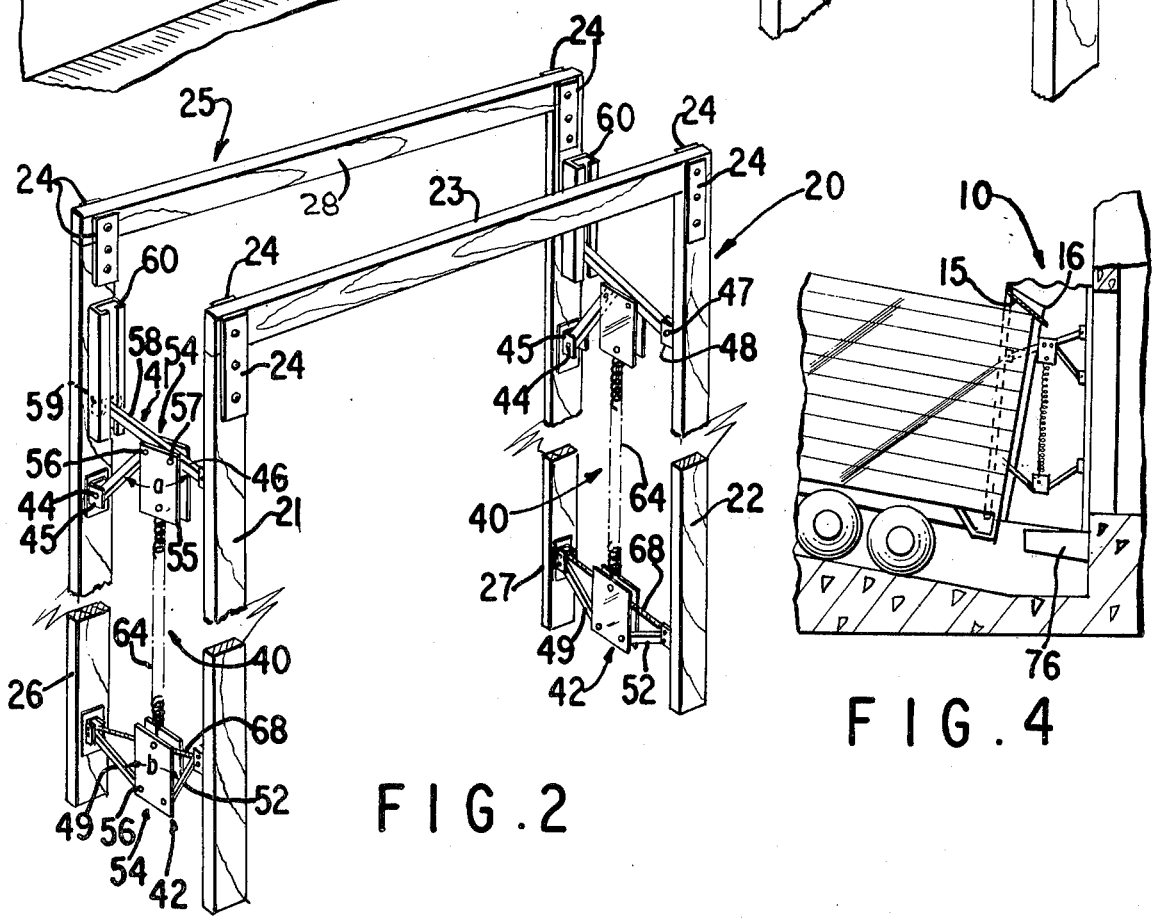

LOADING DOCK SHELTER STRUCTURE

This invention relates to a truck loading dock shelter and, more particularly, to a new and improved extension system for the frame member that supports the face panels and the cover of the shelter.

Dock shelters are provided to shield from outside weather conditions and prevent costly losses of heated or refrigerated air from the passageway between a dock door opening, such as a warehouse door, and the end of a truck body docked proximate thereto for loadng or unloading. A commonly used type of truck dock shelters comprises a front frame member that supports cover materials over the passageway and carries upright face panels for sealing engagement by the end of a truck backed into these panels, together with extension means which normally hold the front frame member in an outward position away from a support structure adjacent to the door opening.

The posture of a truck end at a dock shelter varies with different trucks and with different degrees of loading or unloading of a given truck docked against the shelter. The posture of the truck end differs also with a different declination or inclination of the approach to the loading dock. In current practice, the approach often slopes downwardly toward the loading dock. Further, the truck end may sometimes be skewed as it is backed into a shelter.

In the use of known truck dock shelters of the type mentioned, such variations of the truck posture often result in improper engagement and insufficient sealing of the truck end with the face panels of the shelter.

It is a principal object of the present invention to provide in a loading dock shelter an extension system by which the face panels will be held in proper sealing engagement with the end of a truck docked against them when the truck has any of the various espectable postures relative to the dock door opening.

Another object of the invention is to provide a dock shelter of the type mentioned which is relatively simple yet sturdy in construction and operation and which can be installed easily to serve at existing dock doors.

A further object is to provide in a loading dock shelter an extension system which incorporates built-in limit stops to prevent it from being damaged either by excessive extension or by the impact of a truck backed into the shelter.

The dock shelter provided according to the present invention is similar to known structures in that it includes a front frame member for supporting cover material over a passage space between a dock door opening and the end of a truck docked for loading or unloading with this frame member carrying upright face panels for sealing engagement by the truck end and being normally held in an outward position away from a support structure adjacent to the door opening by an extension system that enables the frame member to be displaced toward the opening by the end of a truck being docked. The shelter of this invention, however, is improved in construction and operation by being provided with yieldably biased extension means which are connected pivotably with and support each side of the front frame member at at least two vertically spaced locations thereon so that these support locations are displaceable toward the door opening either together or independently of one another under pressure from a truck end being docked against the shelter. As a result of this system, the face panels and the extensible frame member of the shelter will conform to any expectable posture of the truck end relative to the door opening.

The improved extension system includes for each side of the front frame member upper and lower sets of arms, each of which sets comprises an inner arm and an outer arm that are pivotably interconnected to define an angle therebetween and have respective ends thereof pivotably connected respectively with the support structure adjacent to the dock door opening and with said frame member, and suitable means are provided for applying to each of the sets of arms a force constantly urging the arms thereof toward a more open angular position.

By arranging the two sets of arms so that the respective angles which they define are oppositely disposed, the arm sets can be biased toward more open positions, for outward extension of the frame member, by a single, common force applying means. This means may be, for instance, a compression spring or an equivalent pressure device in case of the angles opening away from each other. Preferably, however, it is a tension spring or an equivalent, which interconnects sets of arms disposed so that their angles open toward each other.

In either of the cases mentioned, the inner arm of one of the sets and the outer arm of the other set under the biasing force applied to it, sustain most of the weight of the side of the shelter structure supported by the two sets of arms. The remainder of this weight is sustained, and the outward movements of the frame member limited and stabilized, by a leg of the outer arm of one of the two sets, which leg extends inwardly beyond the pivotable interconnection of the arms of the one set and has its inner end held to the backward support structure by means which enable this end to move freely in a vertical direction relative to that structure.

The outer arm that has a leg extending and held to the backward support structure is limited in the extent of the permitted outward movement of its outer end, so that this arm will never reach a position square to that structure or to the frame member. For this purpose, for instance, the inner arm of the same set has an outer end thereof positioned to abut a portion of the leg and thereby prevent further opening movement of the one set of arms at a certain limited angular disposition of the leg. The extend of outward movement of the portion of the frame member positioned by the other set of arms at the same side of the shelter may be limited, for instance, by a finite length of a flexible tying material fixed at its opposite ends to the support structure and the frame member.

The above mentioned and other objects, features and advantages of the invention will be further evident from the following detailed description and the accompanying drawings of a preferred embodiment of the invention. In the drawings:

FIG. 1 is a perspective view of the loading dock shelter as it appears when installed at a dock door opening;

FIG. 2 is a perspective view of the shelter extension system;

FIG. 3 is an enlarged perspective view of a portion of the extension system at one side of the shelter;

FIG. 4 is a schematic illustration of a truck end being backed into the shelter.

As shown in the accompanying drawings, a shelter 10 is provided for installation on a building wall 12 at a dock door opening 13 therein, to shield from weather conditions and to prevent losses of heated or refrigerated air from a passageway between the door opening and the end of a truck body docked against the shelter for loading or unloading. The shelter includes a cover 14 of flexible sheet material which is fixed to a support structure bordering the door opening, such as a rigid back frame member 25 fastened there to the face of the building wall, and which extends outwardly from the wall to a supporting frame member 20 so as to define a covered passageway from the front of the shelter to the dock door. The front frame member 20 carries several upright face panels including a top face panel 15 depending from its header 23 and two side face panels 16 and 17 mounted on header 23 and along side frame elements 21 and 22 of the front frame member. The side face panels contain resilient stiffening strips 74 which normally hold these panels substantially in the plane of the front frame member but enable them to be flexed backwardly under pressure for proper sealing engagement with a truck end being backed to the shelter.

The front frame member 20 and the face panels thereon are normally held in a certain outward position away from the door opening by a yieldably biased extension system 40 at each side of the shelter. Each extension system is mounted on a suitable support structure such as the side frame elements 26 or 27 of the back frame member, at a side of the door opening and is connected pivotably with a side element 21 or 22 of the front frame member to support the latter at at least two spaced apart locations. As will be explained hereinbelow, these locations are displaceable toward the door opening either together or independently of one another under the forces applied by the end of a truck bearing against the face panels.

The header 23 and side elements 21 and 22 of the front frame member are rigidly secured together by suitable fasteners such as screw plates 24. The back frame member 25 is similarly constituted by the two upright back frame elements 26 and 27 and a header 28, which are secured together by screw plate 24. The elements, or pieces, of each frame member may be formed of any suitably strong rigid structural material, for instance, they are pieces of lumber, e.g., wooden two-by-fours, which will easily accommodate common fastening devices such as nails, screws, staples or anchor bolts.

The extension system at each side of the shelter includes an upper and lower sets of rigid arms, indicated at 41 and 42, with the arms of each set pivotably connected to the front and back frame members 20 and 25 and also pivotably interconnected at a location between the frame members so as to define an angle between them. Each upper set of arms includes an inner arm 43 and an outer arm 46; each lower set, an inner arm 49 and an outer arm 52. The upper inner arm 43 is pivotably connected at its inner end, as by a pivot pin 44 and bracket 45, to an upper portion of a back side frame element 26 or 27, i.e., to a support structure fixed adjacent to the side of the dock door opening 13. The upper outer arm 46 has its outer end similarly connected by a pin 47 and bracket 48 secured to an upper portion of a front side frame element 21 or 22. In like manner, the inner and outer arms 49 and 52 of the lower arm set have their respective inner and outer ends pivotably connected to respective lower portions of a back side frame element 26 or 27 and a front side frame element 20 or 21.

The pivotable interconnection of the inner and outer arms of each of the two sets is effected, in the illustrated embodiment, by a coupling device 54 which includes two parallel plates 55 lying at the opposite sides at, and bridging the apex of an angle $a$ defined by convergent portions of the arms of the upper sets, and an angle $b$ defined by convergent portions of the arms of the lower sets. Each set of the coupling plates has an outer end portion of one of the inner arms 43 or 49 pivoted between the plates on a pin 56, and an intermediate portion of one of the outer arms 46 or 52 pivoted between them on a pin 57.

As seen in FIGS. 2 and 3, the outer arm 46 of each upper set 41 has a leg 58 thereof extending inwardly, beyond its connection with the related coupling plates 55, to an inner end thereof which is held to the related back side frame element 26 or 27 yet is freely displaceable relative thereto in a vertical direction. For this purpose, the leg end carries rollers 59 thereon which are confined within a vertical channel member 60, or trackway, fixed to the back side frame element.

It will be apparent that the angular dispositions of the arms of each set 41 or 42 will vary correspondingly to different degrees of extension away from the support structure of the portion of the front frame member 20 that is supported on the outer end of the outer of these arms. In the illustrated embodiment, the arms of the upper set are arranged to define a downwardly opening $a$, while those of the lower set define an upwardly opening angle $b$ (FG. 2). Since at each side thereof these angles are oppositely disposed and open toward each other, the arms of both sets can be conveniently urged toward more open angular dispositions for outward extension of the frame member and to sustain its weight, by a single force applying means acting with common pulling force on both of the arm sets at each side of the shelter. This means, as shown, is simply a coiled tension spring 64 which is stretched vertically in the space between the respective coupling devices 54 of the two sets of arms and has its opposite ends connected to pins 65 fixed between the plates 55 of these coupling devices.

In a typical dock shelter embodying the invention, the front frame member with the face panels and cover in place normally presents a load on the extension arms amounting, for example, to approximately 75 pounds. A spring 64 applying a tensile force of, for example, about 60 pounds at each side of the shelter serves effectively to sustain the weight of the front frame member, where the permissible extension of the latter away from the backward support structure on the sets of arms is limited to about 2 or 3 feet. As may be discerned from FIG. 2, most of the weight of the frame member is sustained by the inner arms 43 of the upper sets 41 and the outer arms 52 of the lower sets 42, though with a balanced distribution among all the arms of the load from the frame member and the opposing forces from the springs 64, by reason of the arrangement of the arms and springs and their pivotable connections. A remainder of the weight of the frame member is sustained by the outer arms 46 of the upper sets through the legs 58 of these arms and the connections at 59–60 which hold their inner ends to the fixed back side frame member.

Since the legged arms 46 bridge the shelter space between the frame members, they limit the permitted distance of outward extension of the respective portions of the front frame member which are supported on their outer ends, and their slope, or angular relation to the respective inner arms 43, varies with the degree of extension, or of backward depression of those frame portions. These long outer arms, however, are not permitted to reach an extension position nearly square to the frame members, as this would render them unresponsive to forces applied to the front frame member by a truck backing into the shelter, with danger of damage to the shelter structure. To prevent this, the coacting inner arms 43 of the same sets have their outer ends 67 positioned, beyond the portions thereof engaged by the pivot pins 56, at a location such that each of these ends, by abutting a portion of the adjacent leg 58, will act at a predetermined limited angular disposition of that leg to prevent further opening movement of the related set of arms.

The extent of opening of the angle of the arms of each of the lower sets, so the distance of outward movement of the lower portion of the frame member supported by them, may also be limited by suitable stop means. For this purpose it is convenient to fix the opposite ends of a finite length of a flexible tying material 68, such as a piece of the type of cable used for aircraft controls, to lower parts of the side frame elements of the back and front frame members at each side of the shelter.

The cover 14 of the shelter is constituted by a tough flexible, weatherproof material e.g., a vinyl impregnated nylon fabric. The cover is fastened to the wall header and each of the back side frame elements by weather resistant trim-flats 70 applied over the back edge of the cover and secured in place by fasteners 71. The front edge of the cover is similarly fastened to the front frame member by weather resistant trim strips 72 and fasteners 73. The resilient stiffening strips 74 in the side face panels 16 and 17 may be spring-like stays of material such as "vicryl" which will fold back under pressure on entry of a truck into the shelter. The top panel 15 preferably has abrasion resistant wear strips 75 secured to it at the truck corner impact areas. The shelter typically has an overall width of approximately 11 feet and an overall height of about 10½ feet, with each side face panel typically having a width of approximately 2 feet and the top face panel extending about 3 feet down from the shelter top; an opening approximately 7 feet wide and a little over 7 feet high normally exists between the face panels. A shelter so dimensioned will accommodate truck ends of up to 8 feet wide by 13½ feet in height from ground level.

In the use of the shelter, a truck to be loaded or unloaded is docked at the loading door opening by being backed toward the opening until its rear end has moved into engagement with the face panels and pressed them backward so as to seal them against the ends of the top and side walls of the truck body. The truck is prevented from backing too far into the shelter by a bumper 76 mounted on the base of the loading dock. The forces of the impact and the continued pressure of the truck end act through the face panels on the front frame member and are resisted by the forces yieldably applied through the arm sets 41 and 42, from the spring 64, at the locations of the pivotable arm connections 47, 48 which support the front frame member. Thus, there are two vertically spaced locations on each side element of the front frame member, making four locations in all, where the shelter is yieldably supported by the biased extension system, and these locations are displaceable backwardly from their normal position either all together or independently of one another, under the forces applied to the front frame member from a truck end entering or in the shelter. If the truck end is slanted downwardly, as indicated schematically in FIG. 4, the frame support locations of the upper arm sets will displace farther inward than those of the lower arm sets. If the truck end is skewed in the horizontal plane, the frame support locations at one side will displace farther inward than those on the other side.

The extension system thus enables the shelter to adapt itself for proper sealing engagement with a truck end entering it at any of the various postures expectable in practice. Further, it will maintain an effective sealing engagement notwithstanding shifts of the truck body posture in the course of loading or unloading.

I claim:

1. In a truck dock shelter including a substantially rigid front frame member comprising a header element and spaced apart upright side frame elements for supporting cover material over space at a dock door opening and for carrying upright face panels for engagement by a truck end being docked opposite said opening, and extension means normally holding said frame member in an outward position away from support structure adjacent to said opening yet enabling said panels to be displaced toward said opening by said truck end, the improvement wherein said extension means comprise yieldably biased means connected pivotably with and supporting each of said side frame elements at at least two vertically spaced locations thereon which are displaceable toward said opening either together or independently of one another under pressure from said truck end so that said face panels will conform to any posture of said truck end relative to said opening, said yieldably biased means including for each said side frame element upper and lower sets of arms each of which sets comprises an inner arm and an outer arm pivotably interconnected to define an angle therebetween and having respective ends thereof pivotably connected with said support structure and the related side frame element, and means interconnecting the said sets of arms for applying oppositely to them in common a force constantly urging the arms of each of said sets toward a more open angular position.

2. A truck dock shelter according to claim 1, the respective angles of said sets of arms being oppositely disposed, and said force applying means comprising means common to the two sets of arms for interconnecting and applying said force oppositely to both of said sets.

3. A truck dock shelter according to claim 1, the outer arm of one of said sets having a leg extending inwardly beyond its interconnection with the inner arm of said one set, and means for holding the inner end of said leg to, yet enabling movement of the same in a vertical direction relative to, said support structure.

4. A truck dock shelter according to claim 3, said holding means comprising rollers secured to the inner end of said leg and upright guide tracks overlying said rollers and fixed relative to said support structure.

5. A truck dock shelter according to claim 3, the inner arm of said one set having its outer end positioned to abut a portion of said leg and thereby limit the angular opening movement of said one set of arms to a certain disposition of said leg.

6. A truck dock shelter according to claim 5, and means for limiting the extent of movement away from said support structure of the portion of said frame member supported by the other of said sets of arms.

7. A truck dock shelter according to claim 6, said movement limiting means including a finite length of a flexible tying material fixed at opposite ends thereof to said support structure and a part of said frame member near said portion thereof.

8. A truck dock shelter according to claim 1, said arms of each of said sets being pivotably interconnected through at least one rigid member that bridges and is pivoted to convergent portions of said arms, and the angle defined by the arms of each set opening toward the angle defined by the arms of the other set, said force applying means comprising a tension spring interconnecting the respective bridging members of said sets of arms.

9. In a loading dock shelter, a frame member including two upright side frame elements for supporting cover material over the passageway between a dock door opening and the end of a truck body docked proximate thereto and carrying upright face panels for engagement by the truck end, and a system of extension arms connected between each of said side frame elements and support structure positionable adjacent said door opening, each system comprising two vertically spaced sets of arms, each of the upper of said sets including an inner arm having an end thereof connected pivotably with said support structure and an outer arm having one end thereof connected pivotably with a respective side frame element and the other end thereof connected pivotably and slidably to said support structure, each of the lower of said sets including an inner arm having an end thereof connected pivotably with said support structure and an outer arm having an end thereof connected pivotably with a respective side frame element, the inner and outer arms of each set being maintained at an angular disposition relative to the respective support structure and side frame element connected pivotably therewith by pivotal connections to a rigid member therebetween, and a coil spring connected to each of said sets applying a continuous force to each said arm thereof to bias the angular disposition thereof to a more open position thereby providing an extension force to each side frame element at each of two spaced locations thereon.

10. An apparatus as defined in claim 9, the inner and outer arms of each set being connected to said rigid member at convergent portions of said arms to define an angle opening toward the angle defined by the set vertically spaced therefrom, said coil spring comprising a tension spring connected at one end thereof to the rigid members of each vertically spaced set of arms.

11. An apparatus as defined in claim 9, said inner arm of each of the upper sets having an outer end thereof extending beyond the pivotal connection thereof to said rigid member, said outer end being positioned to abut a leg of said outer arm of said set between the pivotal connection thereof to said rigid member and the end of said outer arm pivotably and slidably connected to said support structure in a predetermined maximum angular disposition of the arms of each said set to provide a limit to said maximum angular disposition.

12. In a truck dock shelter including a frame member for supporting cover material over space at a dock door opening and carrying upright front panels for engagement by a truck end being docked opposite said opening, and extension means normally holding said frame member in an outward position away from support structure adjacent to said opening yet enabling said panels to be displaced toward said opening by said truck end, the improvement wherein said extension means comprises upper and lower sets of arms each of which sets comprises an inner arm and an outer arm pivotably interconnected to define an angle therebetween and having respective ends thereof pivotably connected with said support structure and said frame member, the arms of each set being pivotably interconnected to define the angle therebetween through at least one coupling plate bridging and pivoted to convergent portions thereof, the angle defined by the arms of each set opening toward the angle defined by the arms of the other set, the outer arm of said upper set having a leg thereof extending inwardly beyond said at least one coupling plate thereof and having secured on the inner end of said leg rollers confined within upright guide trackways fixed to said support structure so that said inner end is movable in a vertical direction relative to the said support structure, and a tension spring interconnecting the respective coupling plates of said sets of arms and constantly urging said sets of arms toward more open angular positions so as to sustain the weight of said frame member while enabling it and said front panels to conform to any posture of said truck end relative to said door opening.

13. A truck dock shelter according to claim 11, said inner arm of said upper set having its outer end positioned to abut a portion of said leg and thereby limit outward movement of the outer arm of said upper set of arms at a certain extent of angular opening of the arms of said upper set.

* * * * *